United States Patent [19]

Menke

[11] 4,158,137

[45] Jun. 12, 1979

[54] METHOD OF AND THERMOGRAPH FOR PRODUCING AND DISPLAYING THERMOGRAPHIC PICTURES

[75] Inventor: Josef F. Menke, Glücksburg, Fed. Rep. of Germany

[73] Assignee: Elektro-Optik GmbH & Co K.G., Glücksburg, Fed. Rep. of Germany

[21] Appl. No.: 905,900

[22] Filed: May 15, 1978

Related U.S. Application Data

[63] Continuation-in-part of Ser. No. 681,400, Apr. 29, 1976, abandoned.

[30] Foreign Application Priority Data

Apr. 29, 1975 [DE]  Fed. Rep. of Germany ....... 2518937
Jul. 19, 1975 [DE]  Fed. Rep. of Germany ....... 2532326

[51] Int. Cl.$^2$ .............................................. H01J 31/49
[52] U.S. Cl. ..................................... 250/332; 250/334
[58] Field of Search ............................... 250/334, 332

[56] References Cited

U.S. PATENT DOCUMENTS 3,970,841   7/1976   Green ................................... 250/201

Primary Examiner—Harold A. Dixon
Attorney, Agent, or Firm—Becker & Becker, Inc.

[57] ABSTRACT

A method of and thermograph for producing and displaying thermographic pictures, according to which a plurality of rasters of different fineness are superimposed relative to each other. The thermograh for practicing this method includes a dual raster arrangement for producing rasters of different fineness.

10 Claims, 3 Drawing Figures

METHOD OF AND THERMOGRAPH FOR PRODUCING AND DISPLAYING THERMOGRAPHIC PICTURES

This is a continuation-in-part of co-pending application Ser. No. 681,400—Menke filed Apr. 29, 1976, now abandoned.

The present invention relates to a method of producing and displaying thermographic pictures, especially pictures of objects with temperatures which greatly differ from each other, and also concerns a device for practicing said method.

For quality evaluation of such devices, so-called thermographs, the terms NEFD and NeΔT are internationally known. NEFD designates the noise equivalent ray density which is necessary in order to generate a signal in a thermograph. NEFD is measured in W per square centimeter. NEΔT designates the noise equivalent minimum temperature difference which a thermograph can still resolve. This temperature differential is measured in degree Kelvin. The formula for NEFD reads:

$$NEFD = \frac{\sqrt{A_d \cdot \Delta f}}{D^* \cdot A_D \cdot \eta_o \cdot \eta_\theta}$$

The formula for NEΔT reads:

$$NEAT = \frac{NEFD}{\frac{dH_\partial}{dT} \cdot \Omega \cdot \Delta_\partial}$$

In the above formulas the meaning of the characters is as follows:

- $A_d$   Detector Surface [cm$^2$]
- $\Omega$   Momentary view angle [sr]
- $A_D$   Surface of the entrance pupil [cm$^2$]
- $D^*$   Specific detector sensitivity [cm$^2$ Hz/W]
- $D$   Diameter of the entrance optic [cm]
- $\eta_o$   Optical degree of efficiency
- $\eta_e$   Electrical efficiency
- $\Delta f$   Band width [Hz]
- NEFD   Noise equivalent beam density [W/cm$^2$]
- NEΔT   Rausch noise equivalent temperature resolution [°K]
- $dH_\lambda/dT$   Change in intensity per temperature and wave length interval [W·cm$^{-2}$·sr$^{-1}$·μm$^{-1}$·K$^{-1}$]
- $\lambda$   Wave length [μm]

From these formulas it will be evident that the temperature resolution is inversely proportional to the geometrical resolution. A thermograph for terrain observation should on one hand assure maximum scenery recognition, for instance forest, river, field, trees, and on the other hand should nevertheless be able to produce high detailed recognition (vehicles, pedestrians, etc.). This requirement can by means of the customary technique, namely fine screens or rasters, be met only with a considerable number of elements. The NEFD must be very small in order later to assure also a smaller NEΔT.

The object of the present invention consists in a method of producing and displaying thermographic pictures in such a manner that it combines a satisfactory scenery recognition with a high detail recognition.

It is another object of the present invention to develop a device for performing the method set out in the preceding paragraph in a way that a superimposed displaying of both screens or rasters in a simple manner is made possible.

These and other objects and advantages of the invention will appear more clearly from the following specification in connection with the accompanying drawings, in which:

FIG. 2 shows a circuit for two scanning units according to FIG. 1a.

Figure 1:
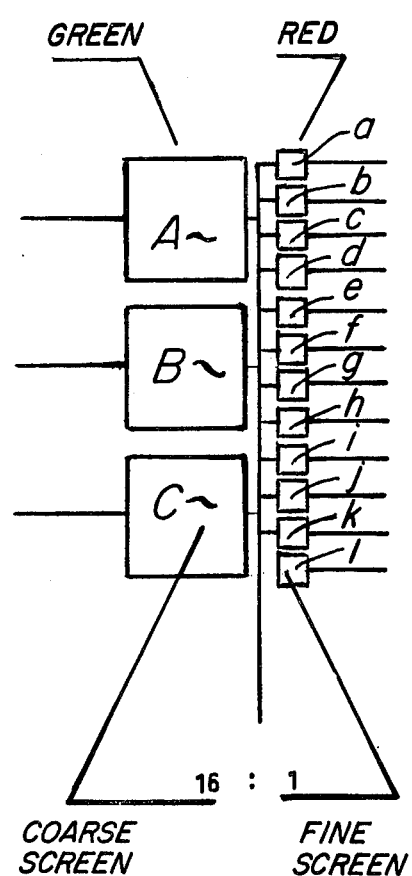
FIG. 1 illustrates two screens or rasters of different size.

According to the method of the present invention for producing and reproducing thermographic pictures, a plurality of screens or rasters of different fineness are superimposed relative to each other so that, with the coarser screen or raster, objects of larger dimension but smaller temperature difference are reproduced, whereas with the finer screen or raster, objects of smaller size but greater temperature difference are indicated.

Thus, for instance, the scenery recognition is already assured with a very coarse screen (resolution 1-3 millirad) because the area of the scenery (field, forest, etc.) is very large. Simultaneously in the scenery there are the least temperature differences (especially slight during rain) because the temperature differential for all objects is practically very slight and only an emission contrast occurs.

The objects especially to be observed (vehicles, pedestrians, etc.) on the other hand have a considerable heat of operation and thus assure a high temperature differential. However, for purposes of recognition and identification, these objects require a high standard of resolution with regard to the thermograph.

For the above outlined reasons it is expedient so to set the picture production and reproduction that a relatively coarse screen or raster is combined with a very fine screen or raster. Various possibilities exist with regard to the construction of the thermograph on the display end. There may, for instance, be used a dual beam oscillograph of different spatial resolution on the picture screen (different point sizes).

Another possibility for the display consists in that for the reproduction in an optically analogous arrangement, hereby luminescent diodes of different sizes are used for the coarse screen or raster and for the fine screen or raster. The utilization of differently sized luminescent diodes for the coarse raster and for the fine raster permits further to produce a clearer picture by using luminescent diodes of different colors for the coarse raster and fine raster. Thus, for instance, for the reproduction of the scenery, green luminescent diodes are used, whereas for the reproduction of details red luminescent diodes are used.

Inasmuch as thermographs in the present technique utilize line scanning methods of a type similar to that used in connection with television and differ from each other only in that for more complicated devices not only one line but an entire line group or perhaps even an entire line-line produces the raster, it is suggested to produce the screen or raster by means of a double cell group. A double raster, however, can be displayed only with their image paints lying side by side but not in superimposition. As a result thereof with regard to the reproduction, this means that for screen display a dual beam device, for luminescent diode reproduction a luminescent diode group corresponding to the receiving side is to be used.

The optical scanning mechanisms are then equal, synchronous and in phase for reception and display. When these two rasters with regard to their degree of fineness are spaced apart by a factor exceeding 10, the assurance exists that in the scenery there will not already occur signals of the details when the temperature differential is not too great.

In the practical performance for the above methods, present-day techniques avail themselves exclusively of line scanning, and as a rule the scan sweeps an entire group of line simultaneously instead only one line. The raster is created by a double group of cells. However, the optical performance of the method involves fairly considerable technical complexities.

A further method according to the invention allows the two pictures to be superimposed in a simple way.

In this method a normal scanning process is combined with an electrical technique which electrically generates a double raster from the signals of the scan.

In this electrical technique several cells are combined in a group and the signals of the cells of each group are used on the one hand jointly in parallel and on the other hand individually. When associated in parallel the signal obtained from the several cells add to form a group signal. This will then create a coarse picture. When severally processed the signals from the several cells are separately transmitted and consequently a large number of closely adjacent values are obtained which in combination form a fine picture.

Referring now to the drawing and FIG. 1 thereof in particular, this figure shows an example for two rasters of different size. The large squares A, B, and C on the left-hand side of FIG. 1 indicate the coarse rasters, whereas the small squares a, b, c, d, e, f, g, h, i, j, k, l on the right-hand side of FIG. 1 indicate the fine rasters. The lateral length of the coarse raster squares A, B, C is about four times as long as that of the fine raster squares a-1. The surface ratio therefore amounts to 16:1. In FIG. 1, by way of example, for the large rasters A, B and C green luminescent diodes may be used for scanning the scenery, whereas red luminescent diodes may be used for the rasters a-1 in connection with the indication of details.

Figure 1A:
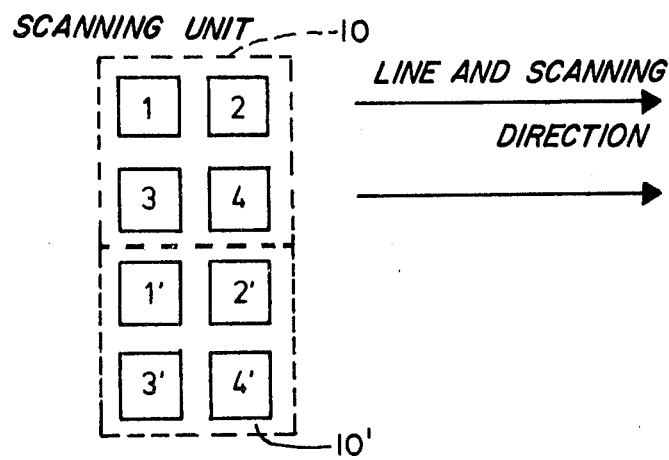
FIG. 1a illustrates the arrangement of two groups of four cells each and their combination to one scanning unit each.
Figure 2:
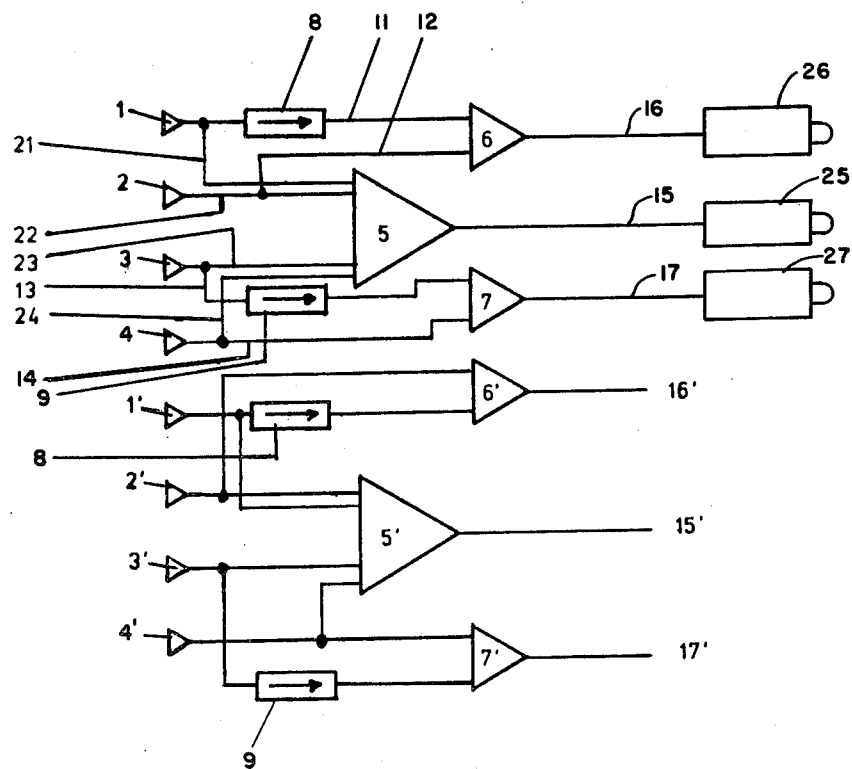

According to a further development of the present invention and, more specifically, in order to make possible a recording or indication in superimposing of the two rasters, the arrangement shown in FIGS. 1a and 2 shows four cells 1, 2, 3, 4 combined in a scanning unit 10 and furthermore shows four additional scanning cells 1', 2', 3', 4' combined in a second scanning unit 10'. The scanning cells 1 and 2 are located on one line, and the scanning cells 3 and 4 are located on the next scanning line. Similarly, the cells 1' and 2' are located on one scanning line, and the cells 3' and 4' are located on the next scanning line. When the scanning unit of one raster consists, as mentioned, of four scanning cells, the coarse raster is generated electrically by arranging in parallel all four cells, whereas the fine raster is produced by series scanning of the cells 1 and 2 and 3 and 4 respectively, and by combining the two pairs. These rasters are surface geometrically finer by the factor 4. Similar remarks, of course, apply to a group 3×3, 4×4, etc.

FIG. 2 shows the individual amplifiers 1-4 and 1'-4' of the cells. Cell amplifier 1 is connected by a line to the conductor 11, the line containing a delay element 8 which provides a delay equal to the difference between scanning times of the same image point between the lines 1 and 2. Cell amplifier 2 is connected to the conductor 12. The conductors 11 and 12 feed the addition amplifier 6 for obtaining the series-scanning signal 16 from line 1 of the fine raster. The individual amplifiers 3 and 4 correspondingly work with addition amplifier 7 for obtaining series-scanning signals 17 for line 2 of the fine raster. The coarse raster signal 15 is obtained from the total of the cell amplifier signals 1, 2, 3, 4 through conductors 21, 22, 23 and 24 by means of the addition amplifier 5. In a similar manner, the cells 1' and 2' are on the one hand connected to the addition amplifier 6' and on the other hand to the addition amplifier 5', and the cells 3' and 4' are connected to the addition amplifier 7' and the addition amplifier 5'. From the amplifiers, the emitted signals pass through lines, conductors or conduits 15, 16, 17 and 15', 16', 17' to the evaluation electronic system.

By a corresponding selection of the size of the scanning units, i.e., the number of the individual cells contained in a scanning unit, it is possible in advance to determine or fix the separation sharpness between the coarse raster and the fine raster.

The features of the present invention emphasizing the recording, resolving, sensing, double raster means for generating rasters of different fineness and electrically producing a dual raster cannot be found specifically in the prior art in exactly the same manner as provided by the disclosure of the present invention.

The expression "one above the other" can be interpreted in different ways and among others so that different raster are used for picture portions, which in a picture as seen in a surface manner may appear superimposed though lying next to each other. With the present invention, the entire picture is written or drawn with coarse and with fine raster. For this reason, the expression "one above the other" can be replaced by way of the wording "superimposed relative to each other."

With the method of U.S. Pat. No. 3970841—Green issued July 20, 1976 particularly in the individual surface portions there are likewise different raster drawn or written over each other. This drawing or writing over another however, does not extend so far as the entire picture surfaces but rather is limited only to individual portions of the picture surface which arouse particular interest. If such point-formed surfaces are recognized with the coarse raster upon the picture surface, then conversion to fine raster occurs (description, column 1, lines 43-47).

In contrast to the foregoing with the present inventive method, there is stressed that the entire picture surface is written or drawn with coarse and fine raster. The infrared (IR) picture arises thereby that the fine raster detectors respond only with (IR) infrared beams or radiation of higher temperature and the coarse raster detectors in contrast respond only with (IR) infrared beams or radiation of low temperature.

The present inventive method differs from the embodiment of Green most of all by way of the basic object involved therewith. There is to be achieved simultaneously a sufficient recognition of the background and a maximum lifting or emphasizing of the observed object relative to the background, and more particularly in the same picture. In order to achieve this object, the entire picture must be sensed in both rasters and transcribed accordingly.

With the disclosure of Green there is first sought a location with the aid of the coarse raster which could be of interest for observation purposes. Then the location of interest is investigated individually with the fine raster (description, column 1, lines 44–47). Accordingly, only the transmitted locations of special interest are sensed in both rasters and the remaining surface is left only to be sensed in coarse raster.

With the Shaw disclosure, the different raster are attained by way of different sensing or detecting speeds ($u = n \times r$). With the Green disclosure, different types of detectors are used with coarse raster and fine raster. The change from one raster to the other occurs by shifting of the object.

With the inventive method identical detectors are used for the picture or image. The transition from coarse raster to fine raster occurs electrically by a switching action.

The object of the present invention consists in a method of producing and displaying thermographic pictures in such a manner, that it combines a satisfactory scenery recognition with a high detail recognition.

It is another object of the present invention to develop a device for performing the method set out in the preceding paragraph in a way that a superimposed writing of both screens or rasters in a simple manner is made possible.

However for purposes of recognition and identification these objects require a high standard of resolution with regard to the thermograph.

A double cell raster, however, can be written only side by side but not in superimposition. As a result thereof with regard to the reproduction this means that for screen display a double beam device, for luminescent diode reproduction a luminescent diode group corresponding to the receiving side is to be used.

Cell amplifier 1 is connected by a line to a conductor 11, the line containing a delay element 8 which provides a delay equal to the difference between scanning times of the same image point between lines 1 and 2.

A delay element consists of a coil which is built into a conduit or line and consequently lengthens the path for a signal passing through the line or conduit such that the signal arrives at the end of the line or conduit at a later time being prescribed by interval of delay. In the present situation this would mean that a signal passing through the line conduit or conductors 11 from the cell amplifier 1 due to the installation of a delay element does not reach the amplifier 6 until the signal emitted from the cell amplifier 2 at a later time point arrives by way of the shorter line or conductor 12; in other words, the arrival of the signal emitted from the cell amplifier 1 must be delayed between cell amplifiers 1 and 2 by the amount of time difference of the sensing or detecting of a picture or image point. This point should now be clarified sufficiently without requiring any additional drawing.

The following clarification is made concerning how the individual lines or conductors cooperate in order to generate a thermographic picture by using coarse and fine raster. If one believes special means for switching from coarse raster to fine raster are necessary, then there may be missed a disclosure of these means in the description. Concerning this situation, the following clarifying statements are provided: the infrared radiation received by the receiving cells 1–4 and 1'–4' have different radiation density according to the temperature of the object emitting the beams or radiation. At high temperatures the radiation densities are also high and at low temperatures the radiation densities are low. A high density of the arriving radiation generates in the receiving cell a signal of high current strength respectively large amplitude and a beam or radiation of nominal radiation density generates a signal of nominal current strength. If now the fine raster conductors 16, 17 and 16', 17' connected to luminescence diodes which respond only to large current strengths and the conductors 15 and 15' are connected to luminescence diodes 25 which respond only to small current strengths, accordingly during sensing or detecting locations of higher temperature, the picture or image is written or displayed automatically with fine raster and during sensing or detecting of locations having low temperature, the picture or image is automatically displayed with coarse raster. In the same manner, the conductors 16' and 17' are connected with luminescent diodes for high current strength (not shown) and the conductor 15' is connected with a luminescent diode 25' for low current strength (not shown).

The conductors 15 and 15' likewise may have signal current flowing therethrough during sensing or detecting of locations of high temperature. Since the luminous diodes connected thereto, however, do not respond to high current strengths, these luminous diodes do not illuminate and the coarse raster remains unwritten or not displayed. The same is true for the conductors 16, 17 and 16', 17' during sensing or detecting of locations having low temperature, in other words with more nominal or lower current strength. In this situation the luminescent diodes 26 and 27 connected to the conductors 16, 17 and 16', 17' do not illuminate and the fine raster remains unwritten or not displayed.

For switching or conversion of the picture reproduction from coarse raster to fine raster or vice versa, consequently no additional means or switching devices are needed. This switching occurs successfully moreover automatically dependent upon the temperature of the picture portions which are being sensed or detected at a particular time.

With the arrangement according to FIG. 1 every receiving cell has a luninescence diode provided therewith; accordingly, twelve luminescence diodes are provided with twelve fine raster cells and three luminescence diodes are provided for the three coarse raster cells. Under these circumstances, the diodes belonging to the fine raster cells respond only to great current strength of the signal currents; the diodes belonging to the coarse raster cells respond only to signal currents of nominal current strength. This can be clarified in the picture in a simple manner in that the luminescence diodes are permitted to light up in different colors, for instance, those luminescence diodes are red for representing the details of fine raster and those luminescence diodes are green for reproduction in coarse raster. If the sensing beams move according to FIG. 1a from the left to the right, accordingly, the entire picture taken up by the objection first is sensed by the fine raster cells, whereby the luminescence diodes during sensing of zones with a high temperature illuminate in red. The row of coarse raster cells follows directly upon the row of fine raster cells. The luminescence diodes belonging to this raster illuminate in green when zones are low in temperature. Since the sensing movement occurs very quickly and the fine raster cells and the coarse raster cells follow in direct sequence, in the eye of the observer there results a picture with which the zones of red color are so embedded in the zones of green color that closed picture results.

Accordingly in the receiving part the entire picture surface grasped by the objective is sensed both by the coarse raster cells and also by the fine raster cells, whereby the sensing steps or procedure overlap in complete scope. In the reproduction part in contrast, only the parts of the picture surface are displayed or reproduced by the luninescence diodes belonging to the coarse raster cells which represent zones of low temperature; the luminescence diodes belonging to the fine raster cells display or reproduce the parts of the picture surface representing high temperature.

With the arrangement according to FIGS. 1a and 2 there is apparent that one luminescence diode is arranged with every amplifier; moreover, the amplifiers 5 and 5' (coarse raster) each have a diode for signals of nominal current strength (green); the amplifiers 6,7 and 6',7' (fine raster) each have a diode for signals of high current strength (red) therewith. No separate receiving cells are provided for coarse raster and fine raster. The picture surface moreover is sensed only from a row of fine raster cells. The coarse raster is generated in an electronic manner.

Also with this arrangement the entire picture surface is sensed by the receiving cells upon the receiving side. The dividing of the picture surface of the hot zones (red) and cold zones (green) occurs upon the display or reproducing side with the aid of the connected luminescence diodes.

It is, of course, to be understood that the present invention is, by no means, limited to the specific showing in the drawings but also comprises any modifications within the scope of the appended claims.

What I claim is:

1. A method of producing and displaying thermographic pictures, which includes in combination therewith the step of simultaneously superimposing a plurality of rasters of different fineness relative to each other over the entire width and scope of the picture.

2. A method in combination according to claim 1, which includes the step of everywhere superimposing both a coarse raster and a fine raster relative to each other simultaneously by producing objects of large three-dimensional size and slight temperature differential by means of the coarse raster, and by producing objects of small three-dimensional size and great temperature differential by means of the fine raster.

3. A method in combination according to claim 2, which includes the step of respectively reproducing in different color the objects produced by means of a coarse raster and by means of a fine raster.

4. A thermograph in combination according to claim 3, which on the reproduction side includes a two-beam oscillograph with different three-dimensional resolution on the picture screen (different point size).

5. A thermograph in combination according to claim 3, which respectively includes luminescence diodes of different sizes for the reproduction in an optically equivalent arrangement for the coarse raster and the fine raster.

6. A thermograph in combination according to claim 5, in which said luminescence diodes for said coarse raster and said fine raster respectively have different colors.

7. A method of producing and reproducing thermographic pictures in combination according to claim 1, which includes the step of electrically producing a dual raster.

8. A method according to claim 7, which includes in combination the steps of combining a plurality of cells to form one group, arranging said cells in parallel for producing a coarse raster, and controlling said cells individually for producing a fine raster.

9. A method according to claim 1, which includes in combination therewith the steps of arranging a plurality of cells along the contour of a square with the length of said square equalling the basic number and so arranging said cells that by means of one control step the coarse raster is electrically produced by arranging said plurality of cells in parallel, and with the other control producing said fine raster by series-scanning said cells.

10. A method according to claim 9, which includes in combination therewith the steps of: effecting said parallel arrangement by an addition amplifier and times elements preceding said amplifiers.

* * * * *